United States Patent [19]

Ohta et al.

[11] 4,133,584
[45] Jan. 9, 1979

[54] BRAKE FLUID PRESSURE CONTROL VALVE OF A DECELERATION SENSING TYPE

[75] Inventors: Takaaki Ohta, Okazaki; Tomoyuki Nogami, Toyota, both of Japan

[73] Assignee: Toyota Jidosha Kogyo Kabushiki Kaisha, Aichi, Japan

[21] Appl. No.: 880,426

[22] Filed: Feb. 23, 1978

[30] Foreign Application Priority Data

Mar. 15, 1977 [JP] Japan .................................. 52-31381

[51] Int. Cl.² .................................................. B60T 8/14
[52] U.S. Cl. ...................................... 303/24 C; 303/6 C
[58] Field of Search .................. 303/6 C, 22 R, 24 A, 303/24 C, 24 F

[56] References Cited

U.S. PATENT DOCUMENTS

| | | | |
|---|---|---|---|
| 3,476,443 | 11/1969 | Bratten et al. | 303/24 C |
| 3,899,217 | 8/1975 | Ohta | 303/24 C |
| 3,994,533 | 11/1976 | Ohta | 303/6 C |

*Primary Examiner*—Duane A. Reger

*Attorney, Agent, or Firm*—Browdy and Neimark

[57] ABSTRACT

A brake fluid pressure control valve of a deceleration sensing type to be interposed in the hydraulic circuit, which connects, in the hydraulic braking system for a vehicle, the master cylinder and the rear wheel cylinders, with the object of effecting a proper distribution of the braking force, in response to the load degree or condition, to each of the front and rear wheels. The control valve includes a fluid passage, a first plunger for interrupting the fluid passage, and a device for controlling the operation of the first plunger, which device includes in turn a second and a third plungers to control the operation of the first plunger in accordance with the fluid pressure given from the fluid passage via a gravity valve. The third plunger constantly urges through a spring the first plunger, and the second plunger does not abut on the first plunger, while being in an empty or nonloaded state, even under a brake application, but abuts, while being in a heavy loaded state, on the first plunger so as to rigidly urges the same, in order to save the brake pedal stroke or brake oil quantity.

10 Claims, 4 Drawing Figures

BRAKE FLUID PRESSURE CONTROL VALVE OF A DECELERATION SENSING TYPE

BACKGROUND OF THE INVENTION

The present invention relates to a brake fluid pressure control valve or valve assembly for use in an automotive vehicle, and more particularly, to a fluid pressure control valve of the type which senses deceleration rate or degrees of a vehicle for supplying a braking hydraulic pressure suitable for the deceleration rate to the rear wheel cylinders.

As a vehicle in running is supplied with an excessively high hydraulic pressure to the rear wheel brakes, the rear wheels are more likely to be subjected to locking, thereby giving rise to slipping, which often leads to a so-called dangerous skidding phenomenon in addition to a degradation of the braking effect. For avoiding this dangerous locking of the rear wheels it has been practiced to dispose a braking hydraulic pressure control mechanism in the rear brake circuit connecting the master cylinder and the rear wheel cylinders for the purpose of controlling the hydraulic pressure applied to the rear wheel cylinders.

Toku-Kai-Sho-48-54382, laid open in Japan in 1973, is one of the well-known examples of this type. This is a controlling valve of the type for controlling the operative pressure of the braking hydraulic pressure control valve thereby supplying a proper braking hydraulic pressure, corresponding to the load condition of a vehicle, to the rear wheel cylinders, (a) by means of combining (i) a braking hydraulic pressure control valve in which the outlet port pressure keeps the same rate of increase as the inlet port pressure while the inlet port pressure is less than a predetermined value and the outlet port pressure increases, when the inlet port pressure exceeds the predetermined value, at a rate of increase less than the that of the inlet port pressure or at a rate equal to zero, just in a similar way to that of a proportioning valve or a limiting valve, and (ii) an inertia valve, generally called a gravity valve, which interrupts a fluid passage when the rate of vehicle deceleration exceeds a predetermined value; and (b) by means of effectuating a controlled hydraulic pressure by the inertia valve, on a first plunger of the braking hydraulic pressure control valve, through a second plunger and a spring member.

The control valve introduced above is in fact an excellent device which enables the characteristic curve of the rear wheel cylinder to be almost of an ideal form and thereby enables to assure a proper distribution of the braking force, in response to the load condition of a vehicle, between the front and rear wheels. Although it shows such a superior effect, it is still not perfectly free from a disadvantage, that is, a considerably large amount of braking fluid being necessary, which means an increase of the brake pedal stroke.

The aforementioned disadvantage can be attributed to the following reasons: (1) This control valve attempts in principle to control the actuating pressure of the braking fluid by means of varying the resilient force of a spring member applied on a plunger of the braking hydraulic pressure adjusting valve. (2) For controlling the actuating pressure over a wide range, it is required for the spring member to be largely compressed. (3) Large amount of the spring compression requires in turn an elongation of the travel distance or stroke of the plunger therefor, which is inevitably accompanied by an increase of the amount of the fluid employed therefor.

The disclosure of Sho-49-58280, laid open in Japan in 1974, is known as an attempt to solve the above problem. The basic principle of this attempt resides in that: (a) by means of disposing a third plunger which fluidtightly and slidably passes through the second plunger for the compression of the spring member, which third plunger is to be placed in direct abutment on the plunger of the fluid pressure adjusting valve; and (b) by means of rigidly transmitting a part of the force, which is required for controlling the actuating pressure of the hydraulic pressure adjusting valve, not through the compression of the spring member; it aims a reduction of the fluid amount employed through the reduction of the compression amount of the spring member.

Several other disclosures further improved, based on this concept, have been published such as, 49-58281, 49-116468, 50-24677, 50-63371, etc., all laid open in Japan. A disadvantage common in those disclosures can be characterized in that the fluid pressure valve of this kind will not be actuated before the inertia valve is closed, because the third plunger passing through the second plunger is in direct contact or abutment with the plunger of the fluid pressure adjusting valve, and the pressure receiving area of the former (the third plunger) is equal to or larger than that of the latter (pressure adjusting valve) plunger. This disadvantage consequently leads to narrowing of the design freedom, or restricting of the free designing, and to an enlargement and/or a complication of the construction.

It is therefore an object of this invention to provide a control valve simple in construction, less in the fluid amount employed, having a broad freedom of designing based on a different concept for solving the problem from the disclosure of Sho-49-58280 and others, and further improved by eliminating the weakpoint or disadvantage of Sho-48-54382 invention.

It is another object of this invention to provide a control valve of the type in which the actuating point of a so-called proportioning valve is to be controlled by a so-called gravity valve whereby a proper distribution of the braking force, in accordance with the load condition of a vehicle between the front and rear wheels is performed, and in which the reduction of the fluid amount employed can be achieved.

It is still another object of this invention to provide a control valve of the type in which the actuating point of a so-called limiting valve is to be controlled by a so-called gravity valve whereby a proper distribution of the braking force, in accordance with the load condition of a vehicle, to the front and rear wheels is performed, and in which the reduction of the fluid amount employed can be achieved.

Further objects and advantages of this invention will be more apparent from the undermentioned description in detail with reference to the accompanying drawings and the appended claims.

Figure 1:
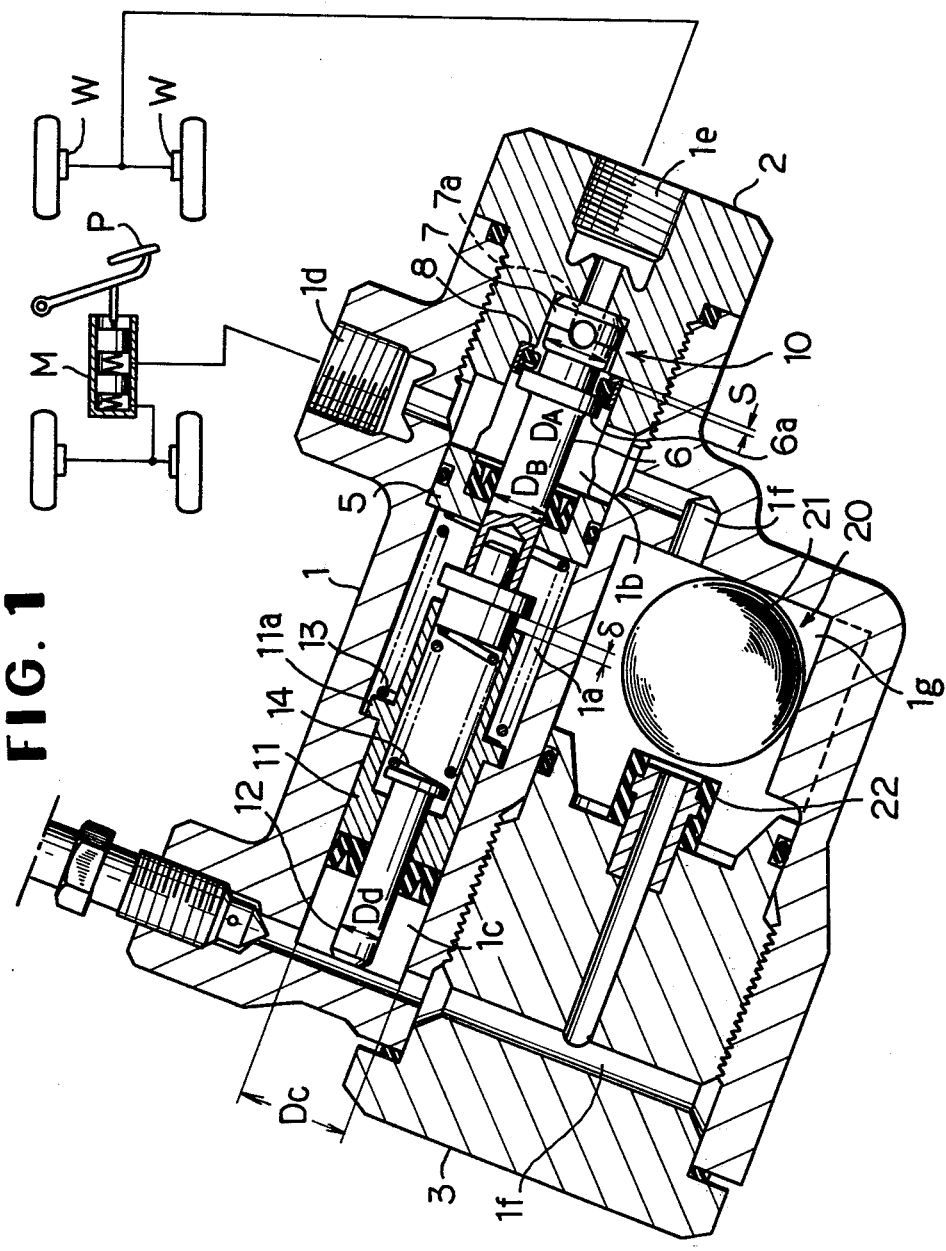
FIG. 1 is a longitudinal cross-section of an embodiment.

Some preferred embodiments will be hereunder described in detail referring to the drawings.

In FIG. 1 numeral 1 represents a valve housing, having near the central portion thereof an air chamber $1a$ communicated with the ambient atmosphere; on either side of which in a longitudinal direction are provided a first hydraulic pressure chamber $1b$ and a second hydraulic pressure chamber $1c$, respectively; the valve housing is being threaded into on either end thereof with a plug 2 and a plug 3, which being provided only for helping the assembling process and integrally functioning with the valve housing 1 as a whole after they have been once assembled, and consequently requiring no specific description thereabout.

The first hydraulic pressure chamber $1b$ is fluid-tightly separated from the air chamber $1a$ with a separating wall 5, which in turn being fluid-tightly pierced through by a first plunger 6 (sectional area $D_B$); that is, the first plunger 6 is axially slidably and fluid-tightly retained by the valve housing 1, with one end thereof being extending in the first hydraulic pressure chamber $1b$ and the other end thereof being extending into the air chamber $1a$.

The first plunger 6 at the end portion, on the first hydraulic pressure chamber side, i.e. right side in FIG. 1, integrally formed into a valve body 7 with a slightly larger diameter (sectional area $D_A$); confronting thereto is disposed a valve seat 8 on the bottom portion of the first hydraulic pressure chamber $1b$ for engaging or contacting with the valve body 7. This valve body 7 functions for interrupting the braking fluid passage, by moving in the direction to the air chamber $1a$, i.e. left side in FIG. 1, which passage leads from a port $1d$ to the first hydraulic pressure chamber $1b$ and via a communicating bore $7a$, provided in the valve body 7, and finally to a port $1e$. A flange portion $6a$ formed on the first plunger 6 inside the first hydraulic pressure chamber $1b$ is for properly positioning the valve seat 8; so even when the flange portion $6a$ abuts on a part of the valve seat 8 a clearance for passing the fluid is still left so as not to interrupt the flow of the braking fluid from the port $1d$ to the port $1e$. The above-mentioned parts and the combination thereof construct as a whole a hydraulic pressure adjusting valve 10.

There are provided dual coaxial plungers 11, 12 in the second hydraulic pressure chamber $1c$, the former 11 being slidable fluid-tightly with respect to the valve housing 1 and the latter 12 slidable fluid-tightly with respect to the former 11, both sliding being kept fluid-tight by a common single seal 4. The second plunger 11 coaxially confronts to the first plunger 6 usually with an axial gap $\delta$ as seen in FIG. 1. Both plungers 11, 12 are extending respectively at one end thereof into the second hydraulic pressure chamber $1c$, and at the other end into the air chamber $1a$; between the second plunger 11 and the valve housing 1 is disposed a first spring (compression member) 13, and between the third plunger 12 and the first plunger 6 a second spring (compression member) 14, respectively with a pre-set load. By the reaction of those spring members, the first plunger 6 is constantly biased rightwards; and the second and third plungers 11, 12 are constantly biased leftwards. However, the first and the third plungers 6, 12 are, at the end surface thereof ($6a$, $12a$), and the second plunger 11 is, at the flange portion $11a$ thereof, respectively abutted on the valve housing 1 for being stably settled.

The first hydraulic pressure chamber $1b$ and the second hydraulic pressure chamber $1c$ are interconnected by a communicating passage $1f$, and on the passage $1f$ is disposed an inertia valve 20. The valve 20 is essentially composed of a ball 21 rotably placed in a valve chamber $1g$ and a valve seat 22 disposed on the plug 3; when the ball 21 closely contacts the valve seat 22, the communicating passage $1f$ will be interrupted.

The control valve of this embodiment which is now described in greater detail is constructed of the abovementioned parts incorporated within the valve housing 1, which is to be mounted on a vehicle with the side of the second hydraulic pressure chamber $1c$ being directed to the front of a vehicle, and with the side of the first hydraulic pressure chamber $1b$ being downwardly inclined thereby allowing the ball-supporting surface of the inertia valve 20 to form a certain predetermined angle with the horizontal plane. The port $1d$ is connected to the master cylinder M and the port $1e$ is connected to the rear wheel cylinders W respectively.

Operation of the control valve will be, in the next place, described. When each part of the control valve is arranged in a manner as seen in FIG. 1, depression of a brake pedal P will cause the braking fluid to be delivered under pressure $P_m$ from the master cylinder M, resulting in rising of the hydraulic pressure in the first hydraulic pressure chamber $1b$, with the effect of the first plunger 6 being urged leftwards. While the leftward biasing pressure is less than the preload of the second spring 14, the first plunger 6 will be maintained at the original position, with the braking fluid passage between the ports $1d$ and $1e$ being maintained in communication, and the pressure of the master cylinder M will be applied unchangedly to the rear wheel cylinders. This is indicated on the graph of FIG. 3 as the straight line $OA_1$. When the leftward biasing pressure of the first plunger 6 exceeds the preload of the second spring 14 due to the rising of the pressure in the first pressure chamber $1b$ caused by a further depressing of the pedal P, the first plunger 6 will be moved leftwards with a consequent result of bringing about a contact of the valve body 7 to the valve seat 8. The pressure in the first hydraulic pressure chamber $1b$ at this time, when the braking fluid passage is interrupted by the abovementioned contact of the valve body 7 with the valve seat 8, is called a "refraction point pressure." A further more depressing of the pedal P will cause the increasing of the pressure $P_m$ in the master cylinder while maintaining the pressure $P_r$ in the rear wheel cylinder W unchanged; the first plunger 6 will be pushed back rightwards by a pressure difference generated between the two opposite sides of the hydraulic pressure adjusting valve 10, i.e., when $[P_m \times (D_A - D_B) > P_r \cdot D_A]$, body 7 to be released from the valve seat 8 and thereby causing the braking fluid to flow into the rear wheel cylinder side. The resultant rising of the pressure in the rear wheel cylinder W will force the first plunger 6 to move again leftwards, resulting in re-engagement of the valve body 7 with the valve seat 8. The hydraulic pressure adjusting valve in this embodiment functions, as described in detail above, as a so to speak proportioning valve; so the pressure in the rear wheel cylinder increases, while keeping the relation, against the pressure in the master cylinder, shown as the straight line $\overline{A_1B}$ in FIG. 3.

Figure 2:
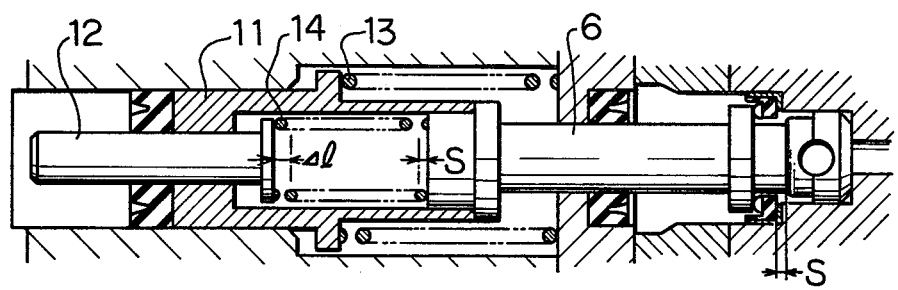
FIG. 2 is a longitudinal cross-section of an essential part of the above embodiment showing another operative condition.

The abovementioned is concerned with an operation when a vehicle is empty or in non-loaded condition. When the vehicle is in a loaded or fully loaded condition, on the contrary, the inertia effect of the whole vehicle is increased, requiring a stronger depression of the pedal P because of a need of a larger braking force to decelerate the vehicle. The pressure in the second hydraulic pressure chamber 1c will therefore be much increased, causing the second plunger 11 to surpass the pre-load of the first spring 3 to shift rightwards as far as axially abutting on the first plunger 6 as shown in FIG. 2, in other words, a gap or space δ between the first plunger 6 and the second plunger 11 now disappears while the gap otherwise does exist. It is an important feature of the present invention that this axial abutting between the first and second plungers which are kept axially apart at least in the empty condition can occur under braking application at least in the fully loaded condition. In a similar manner the third plunger 12 is rightwards shifted to compress the second spring 14. Then the brakes on the front and rear wheels are actuated to decelerate the vehicle; when the deceleration exceeds a certain preset amount the ball 21 is rolled up along the inclined surface due to the inertia as far as abutting on the valve seat 22 to interrupt the communication passage 1f, with a result of trapping the pressure then built up in the second hydraulic pressure chamber 1c.

A further depressing of the brake pedal P will cause the rising of the pressure in the first hydraulic pressure chamber 1b thereby causing the first plunger 6, while leftwards shifting, to push back the second plunger 11 in the same direction. At this time the second hydraulic pressure chamber 1c is in a closed state because of the contacting of the ball 21 to the valve seat 22, so the braking fluid displaced by the second plunger 11 will naturally move the third plunger 12 rightwards by a stroke exactly corresponding to the same volume as displaced; accordingly the second spring 14 will be compressed. As the pressure receiving area (Dc−Dd) of the second plunger 11 is set larger than that Dd of the third plunger 12, so the second spring 14 is compressed by a larger distance Δl than the leftward shift S of the first plunger 6 during the period of time, in which the first plunger 6 begins to leftwardly move and the valve body 7 comes to contact with the valve seat 8. This brings about the pressure rising in the second hydraulic pressure chamber 1c by that amount corresponding to the compression difference of the spring 14. In other words, for the starting of the leftward movement of the first plunger 6 is needed a force equal to the difference, i.e. subtracting the elastic (resilient) force of the first spring 13 from the product of the pressure trapped in the second pressure chamber 1c multiplied by the sectional area DC of the second pressure chamber 1c. In addition, the pressure in the second hydraulic pressure chamber 1c further rises as the first plunger 6 is leftwards shifted thereafter. The above operation will be more understandably explained referring to the graph in FIG. 3. The point where the inertia valve 20 is closed is shown at C and the point where the first plunger 6 starts to move leftwards is shown at D. The point where the valve body 7 comes to engage with the valve seat 8 is shown at $A_2$. From FIG. 3 it should be understood that the distance between the point $A_1$ and the point $A_2$ is extremely large; and it can be achieved by a relatively small amount of shifting of the second plunger 11. It means that the fluid amount employed for actuating the control valve is reduced by a large margin.

Operations in two of the most extreme conditions, that is, in an empty vehicle and in a fully loaded vehicle, are illustrated in the aforementioned description. When the load amount is reduced from the full load, the pressure trapped in the second pressure chamber 1c is lowered, at the moment when the inertia valve 20 is closed, bringing about the reduction of the distance between the point C and the point D in FIG. 3, that is to say, the lowering of the pressure at the refraction point, corresponding to the point $A_2$. A further more reduction of the vehicle load will cause the closure of the inertia valve 20 before the second plunger 11 is abutted on the first plunger 6; and the first plunger 6 will have to compress the second spring 14 a certain amount before it is abutted on the second plunger 11. In other words, the control valve will be operated at a condition wherein an intermediate state of operation, i.e. that between the empty and the fully loaded vehicle state appears.

Furthermore, the inertia valve 20 does not necessarily need to be mounted within the valve housing 1; it may be fabricated separately from the housing for being connected thereto through a piping, for example, or some other appropriate means.

Figure 4:
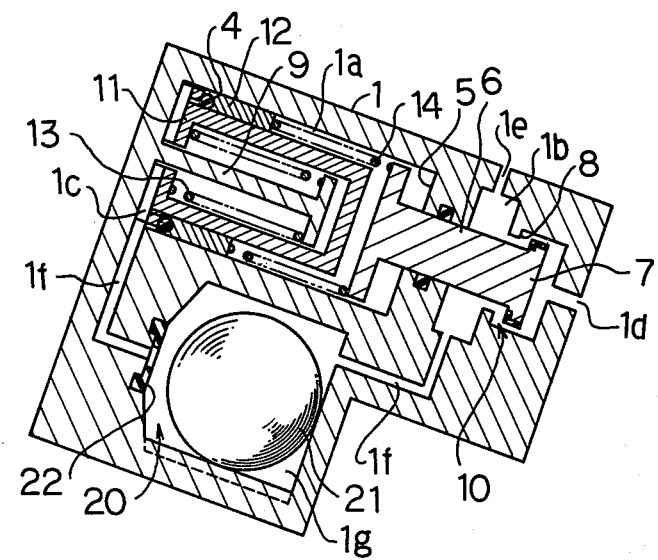
FIG. 4 is a vertical cross-section, schematically shown, of another embodiment.

Referring to FIG. 4, which is schematically illustrated, another embodiment, wherein the third plunger 12 is formed into a cylindrical configuration and the second plunger 11 is being fitted therein, is characteristically observed in that the hydraulic pressure adjusting valve 10 operates as a so-called limiting valve, in comparison with the previous one. Another difference from the first embodiment is that the fluid tightness between the valve housing 1, the second plunger 11, and the third plunger 12 is maintained with a single O-ring 4, and that the first spring 13 is mounted between a spring retainer 9, which is secured to the valve housing 1, and the second plunger 12. Except for the above differences, this embodiment is substantially identical to the first embodiment, which may permit omission of the description only by attaching like numerals or signs to like parts.

For those skilled in the art it would be easy to understand the almost identical way of operation of this embodiment to that of the previous one, which enables the description to be omitted again.

Figure 3:
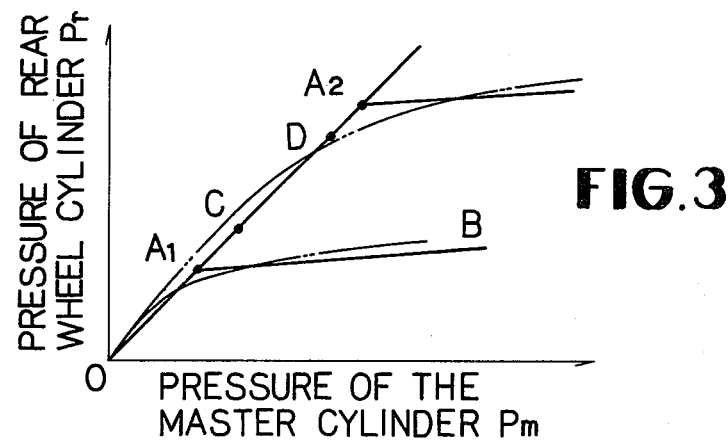
FIG. 3 is a characteristic chart of the operation which the assembly in FIG. 1 showed.

To sum up the fundamental effects of this invention:

It provides a deceleration sensing type brake hydraulic pressure control valve or valve assembly which enables the characteristic chart of the fluid pressure curve of the rear wheel cylinders to easily near to the ideal characteristic curve (as shown in FIG. 3 with a two-dot chain line), even in a case wherein the load amount of a vehicle is varied over a wide range. It also enables the fluid amount employed, when the brake is operated, to be held down in order not to be increased largely, which means the brake pedal stroke can be prevented from a problematical elongation. In this invention it is possible to vary the operative characteristic over an extremely wide range by means of varying in many ways the cross-sectional areas of the first, second, and third plungers, preset loads of the first and second springs, the spring constant values, and the operative deceleration rate of the inertia valve, etc. And simplicity and/or compactness of the construction is also recommended as an innegligible strongpoint of this invention.

What is claimed is:

1. A brake fluid pressure control valve of a deceleration sensing type comprising:
   a valve housing interposed in the rear brake circuit which connects the master cylinder and the rear wheel cylinders in a vehicle braking system and provided with an air chamber and a first and a second hydraulic pressure chambers formed on either side of said air chamber;
a first plunger retained in said valve housing axially slidably and fluid-tightly, with one end thereof extending into said first hydraulic pressure chamber and with the other end extending into said air chamber;
means for interrupting said rear brake circuit when said first plunger is shifted a certain preset distance toward said air chamber;
a communicating passage for transmitting the hydraulic pressure in said rear brake circuit into said second hydraulic pressure chamber;
an inertia valve interposed in said communicating passage being actuated, when the deceleration rate of a vehicle has exceeded a predetermined value, to interrupt said communicating passage;
a second plunger retained in said valve housing axially slidably and fluid-tightly, with one end thereof extending into said second hydraulic pressure chamber and with the other end thereof extending into said air chamber as well as being axially slidable to contact with said first plunger;
a third plunger having an annular cylindrical configuration retained in said second plunger axially slidably and fluid-tightly, with one end thereof extending into said second hyraulic pressure chamber and with the other end thereof extending into said air chamber as well as coaxially confronting to said first plunger;
a first spring member disposed between said second plunger and said valve housing for biasing said second plunger in the direction away from said first plunger;
a second spring member disposed between said first plunger and said third plunger for biasing said both plungers in the direction of keeping away from each other; and
an axial-direction gap provided between said first plunger and second plunger in such a manner that said gap does exist even under braking application when the vehicle is empty, but disappears under braking application at least when the vehicle is fully loaded.

2. The valve as set forth in claim 1, wherein said means for interrupting said rear brake circuit functions as a proportioning valve which transmits the pressure of the master cylinder, after lowering the same in accordance with a certain preset ratio, to the rear wheel cylinders.

3. The valve as set forth in claim 1, wherein said means for interrupting said rear brake circuit functions as a limiting valve which limits the pressure of the rear wheel cylinders at a certain preset value.

4. The valve as set forth in claim 1, wherein said second plunger is of an annular cylindrical configuration, with said third plunger being axially slidably fitted thereinside.

5. The valve as set forth in claim 4, wherein said second plunger and said third plunger are both fluid-tightly sealed with a common single seal member.

6. A brake fluid pressure control valve of a deceleration sensing type comprising:
a valve housing interposed in the rear brake circuit which connects the master cylinder and the rear wheel cylinders in a vehicle braking system and provided with an air chamber and a first and a second hydraulic pressure chambers formed on either side of said air chamber;
a first plunger retained in said valve housing axially slidably and fluid-tightly, with one end thereof extending into said first hydraulic pressure chamber and with the other end extending into said air chamber;
means for interrupting said rear brake circuit when said first plunger is shifted a certain preset distance toward said air chamber;
a communicating passage for transmitting the hydraulic pressure in said rear brake circuit into said second hydraulic pressure chamber;
an inertia valve interposed in said communicating passage being actuated, when the deceleration rate of a vehicle has exceeded a predetermined value, to inperrupt said communicating passage;
a third plunger of an annular cylindrical shape retained in said valve housing axially slidably and fluid-tightly, with one end thereof extending into said second hydraulic pressure chamber and with the other end thereof extending into said air chamber as well as coaxially confronting to said first plunger;
a second plunger retained in said third plunger axially slidably and fluid-tightly, with one end thereof extending into said second hydraulic pressure chamber and with the other end thereof extending into said air chamber as well as being axially slidable to contact with said first plunger;
a first spring member disposed between said second plunger and said valve housing for biasing said second plunger in the direction away from said first plunger;
a second spring member disposed between said first plunger and said third plunger for biasing said both plungers in the direction of keeping away from each other; and
an axial-direction gap provided between said first plunger and second plunger in such a manner that said gap does exist even under braking application when the vehicle is empty, but disappears under braking application at least when the vehicle is fully loaded.

7. The valve as set forth in claim 6, wherein said means for interrupting said rear brake circuit functions as a limiting valve which limits the pressure of the rear wheel cylinders at a certain preset value.

8. The valve as set forth in claim 6, wherein said means for interrupting said rear brake circuit functions as a proportioning valve which transmits the pressure of the master cylinder, after lowering the same in accordance with a certain preset ratio, to the rear wheel cylinders.

9. The valve as set forth in claim 6, wherein said third plunger is of an annular cylindrical configuration, with said second plunger being axially slidably fitted thereinside.

10. The valve as set forth in claim 9, wherein said second plunger and said third plunger are both fluid-tightly sealed with a common single seal member.

* * * * *